United States Patent
Honjo

(10) Patent No.: US 8,500,885 B2
(45) Date of Patent: *Aug. 6, 2013

(54) AIR DRIER FOR AIR SUSPENSION OF VEHICLE

(75) Inventor: Yutaro Honjo, Owariasahi (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 146 days.

This patent is subject to a terminal disclaimer.

(21) Appl. No.: 13/076,046

(22) Filed: Mar. 30, 2011

(65) Prior Publication Data

US 2012/0006198 A1 Jan. 12, 2012

(30) Foreign Application Priority Data

Jul. 9, 2010 (JP) .................................. 2010-156290

(51) Int. Cl.
*B01D 53/02* (2006.01)

(52) U.S. Cl.
USPC ............................ 96/139; 55/DIG. 17; 96/152

(58) Field of Classification Search
USPC .......................................................... 96/139
See application file for complete search history.

(56) References Cited

U.S. PATENT DOCUMENTS

| | | | | |
|---|---|---|---|---|
| 4,111,005 A | * | 9/1978 | Livesay | ............................ 62/503 |
| 5,129,927 A | * | 7/1992 | Tsubouchi | ...................... 96/113 |
| 5,286,283 A | * | 2/1994 | Goodell | ............................ 96/113 |
| 8,216,350 B2 | * | 7/2012 | Honjo et al. | ..................... 96/139 |
| 2010/0206168 A1 | * | 8/2010 | Honjo et al. | ..................... 96/118 |
| 2012/0006198 A1 | * | 1/2012 | Honjo | .............................. 96/139 |

FOREIGN PATENT DOCUMENTS

| | | |
|---|---|---|
| JP | 5-201329 A | 8/1993 |
| JP | 7-328373 A | 12/1995 |
| JP | 2002-119824 A | 4/2002 |
| JP | 2002-306922 | 10/2002 |

OTHER PUBLICATIONS

European Search Report issued by the European Patent Office on Nov. 21, 2011 in European Application No. 11160240.

* cited by examiner

*Primary Examiner* — Duane Smith
*Assistant Examiner* — Joubert X Glover
(74) *Attorney, Agent, or Firm* — Buchanan Ingersoll & Rooney PC

(57) ABSTRACT

An air drier for an air suspension of a vehicle for supplying dry air to the air suspension, includes a housing having inflow and outflow ports formed at first and second ends in an axial direction, first and second filters accommodated in the housing, a desiccant agent supported between the first and second filters, and an air guide member arranged between the first filter and the first end of the housing and including a tubular portion and an annular plate having a plurality of holes, the tubular portion covering the inflow port in the axial direction to form a flow passage guiding fluid from the inflow port to the first filter, wherein the fluid guided from the inflow port flows through the flow passage and the first filter into the desiccant agent and is dried thereby, and the dry air is discharged from the outflow port to the air suspension.

12 Claims, 5 Drawing Sheets

AIR DRIER FOR AIR SUSPENSION OF VEHICLE

CROSS REFERENCE TO RELATED APPLICATIONS

This application is based on and claims priority under 35 U.S.C. §119 to Japanese Patent Application 2010-156290, filed on Jul. 9, 2010, the entire content of which is incorporated herein by reference.

TECHNICAL FIELD

This disclosure relates to an air drier for an air suspension of a vehicle.

BACKGROUND DISCUSSION

A known air drier for an air suspension is disclosed, for example, in JP2002-119824A (hereinafter referred to as Reference 1). The air drier dries air compressed by an external compressor and sends the compressed dry air to an external air control system. The air drier includes a housing having an approximate tubular shape, and a desiccant agent filled within the housing. A compressor-side port connecting to the external compressor is formed in an intermediate portion of one of axial end surfaces of the housing and a control-system-side port connecting to the air control system is formed in the other of the axial end surfaces. The desiccant agent filled within the housing dehumidifies the air passing from the external compressor through the housing to the air control system. When the desiccant agent dehumidifies the compressed air, moisture removed from the compressed air is absorbed into the desiccant agent. As the volume of the absorbed moisture in the desiccant agent increases, the dehumidification function of the desiccant agent gradually deteriorates. For example, in a case where the air drier is continuously in use, the air from which the moisture is removed by the desiccant agent is filled in the external air control system and is thereafter returned to the external compressor via the air drier according to need; thereby, the absorbed moisture in the desiccant agent dries. Accordingly, the volume of the absorbed moisture in the desiccant agent decreases to thereby dry the moist desiccant. Consequently, the dehumidification function of the desiccant agent may be regenerated. In addition, according to Reference 1, even when being arranged in a vehicle or the like in a condition where the axial end surfaces of the housing face a lateral direction of the vehicle or the like, the air drier may surely remove dry dew condensation water in the housing therefrom.

Further, a known water remover disclosed in JP1995-328373A (hereinafter referred to as Reference 2) includes a liquid separator in which a tangential inflow cyclone separator and a water-collection housing are arranged, and a drier with which silica particles are filled. Gas including vapor-phase moisture and liquid-phase moisture flows through the tangential-inflow cyclone separator. The tangential-inflow cyclone separator includes an internal cylindrical portion having a flow passage. The flow passage of the internal cylindrical portion expands toward an opening of the tangential-inflow cyclone separator. A chamber having an expanded flow passage is formed in the water-collection housing (the chamber will be hereinafter referred to as the expanded-flow-passage chamber). The internal cylindrical portion of the tangential-inflow cyclone separator protrudes into the expanded-flow-passage chamber; thereby, an annular groove is formed in the liquid separator. The liquid-phase moisture around the internal cylindrical portion protruding into the expanded-flow-passage chamber is collected in the annular groove of the liquid separator.

Furthermore, a known dehumidifier for a braking system serving as a combined air and hydraulic pressure braking system for a vehicle is disclosed in JP1993-201329A (hereinafter referred to as Reference 3). According to the braking system described in Reference 3, air compressed by an air compressor is stored in an air tank and a braking operation is performed by the air compressed in accordance with a degree by which a driver presses a brake pedal. The dehumidifier includes an air drier and an electrostatic clarifier. The electrostatic clarifier removes oil mist included in the compressed air therefrom. Then, the air drier removes moisture included in the compressed air therefrom by means of a desiccant agent. Thus, according to the braking system according to Reference 3, the oil mist and the moisture that are included in the compressed air are removed therefrom; thereafter, the compressed air is stored in the air tank.

The air drier disclosed in Reference 1 has a large size as a whole; therefore, a large space is required when arranging the air drier in the vehicle. In addition, the water remover disclosed in Reference 2 includes the tangential-inflow cyclone separator and the dehumidifier disclosed in Reference 3 includes the electrostatic clarifier; therefore, the water remover and the dehumidifier have complex configurations, resulting in cost increases.

A need thus exists for an air drier for an air suspension of a vehicle, which is not susceptible to the drawback mentioned above.

SUMMARY

According to an aspect of this disclosure, an air drier for an air suspension of a vehicle for supplying dry air to the air suspension, includes a housing having a tubular shape and including inflow and outflow ports formed at first and second ends, respectively, in an axial direction, first and second filters accommodated in the housing, a desiccant agent supported between the first and second filters, and an air guide member arranged between the first filter and the first end of the housing where the inflow port is formed, the air guide member supporting the first filter and the desiccant agent, the air guide member including a tubular portion including an opening that has an area larger than an area of an opening of the inflow port, a wall portion that extends in the axial direction of the housing, a bottom portion, and an inner surface, the tubular portion covering the inflow port in the axial direction to form a flow passage guiding fluid from the inflow port to the first filter, and an annular plate extending radially outward from the opening of the tubular portion and including a plurality of holes, wherein the fluid guided from the inflow port into the tubular portion passes through the flow passage to the holes of the annular plate to flow through the first filter into the desiccant agent and is dried by the desiccant agent, and the dry air is discharged from the outflow port to the air suspension.

According to another aspect of the disclosure, an air drier for an air suspension of a vehicle for supplying dry air to the air suspension, including a housing having a tubular shape and including inflow and outflow ports formed at first and second ends, respectively, in an axial direction, first and second filters accommodated in the housing, a desiccant agent supported between the first and second filters, and an air guide member arranged between the first filter and the first end of the housing where the inflow port is formed, the air guide member supporting the first filter and the desiccant agent, the air guide member including a tubular portion including an opening that has an area larger than an area of an opening of the inflow port, a wall portion that extends in the axial direction of the housing, a bottom portion, and an inner surface, the tubular portion covering the inflow port in the axial direction, and an annular plate extending radially outward from the opening of the tubular portion and including a plurality of holes.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 9:
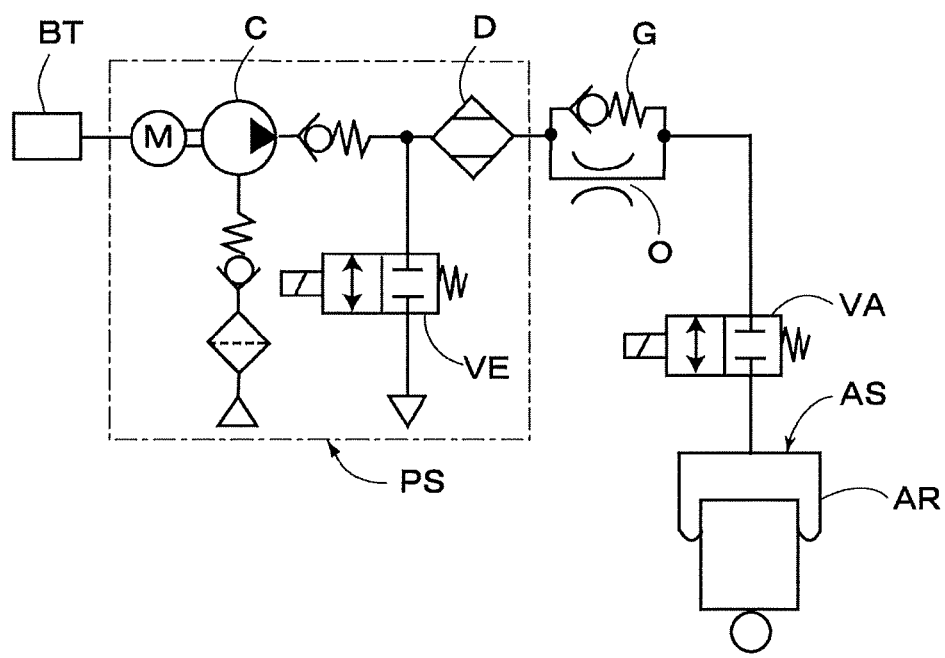
FIG. 9 is a block diagram illustrating an air supply source including a known air drier for the air suspension.

A first embodiment of this disclosure will be described as follows with reference to illustrations of the attached drawings as follows. An overview of an air supply source PS including an air drier D for an air suspension of a vehicle, according to the first embodiment will be explained with reference to FIG. 9. The air supply source PS supplies compressed air to an air spring AS of the air suspension of the vehicle. When a compressor C is driven by a motor M electrically connected to a battery BT, the air supply source PS is configured so that the dry air (compressed air) is supplied via the air drier D and a check valve G to an air room AR of the air spring AS. Further, in a condition where a discharge valve VE (electromagnetic opening/closing valve that is consistently closed) and a control valve VA are opened when the compressor C is not in operation, the air supply source PS is configured so that the air is discharged from the discharge valve VE via an orifice O and the air drier D. At this time, the air drier D in a moist state turns therefrom to a dried state. In addition, the orifice O and the check valve G may be accommodated in the air drier D or may be formed integrally therewith.

Figure 1:
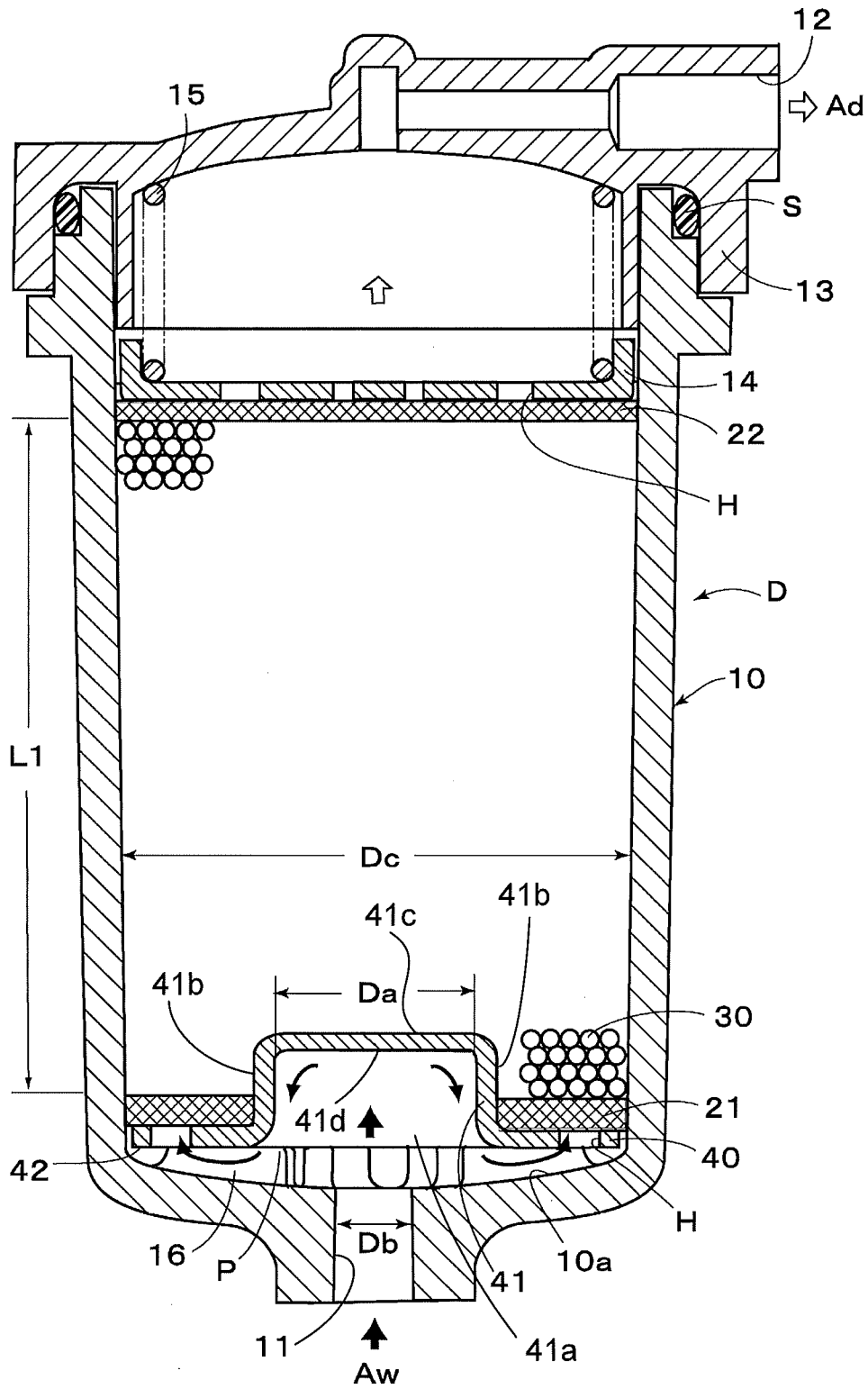
FIG. 1 is a cross sectional view of an air drier for an air suspension of a vehicle, according to a first embodiment of this disclosure.

As illustrated in FIG. 1, the air drier D includes a housing 10, first and second filters 21 and 22, desiccant agents 30, and an air guide member 40. The desiccant agents 30 accommodated in the housing 10 are sandwiched between the first filter 21 and the second filter 22. The housing 10 having a tubular shape includes inflow and outflow ports 11 and 12 that are arranged at first and second ends, respectively, in an axial direction. Fluid (indicated by Aw and corresponding to compressed air including moisture outputted from the motor M) guided from the inflow port 11 through the air guide member 40 is dried by the desiccant agents 30 and dry air Ad is discharged from the outflow port 12. Then, the dry air Ad is supplied to the air spring AS. In addition, the desiccant agents 30 include silica particles and the first filter 21 and the second filter 22 having annular-plated shapes are formed by nonwoven materials.

Figure 10:
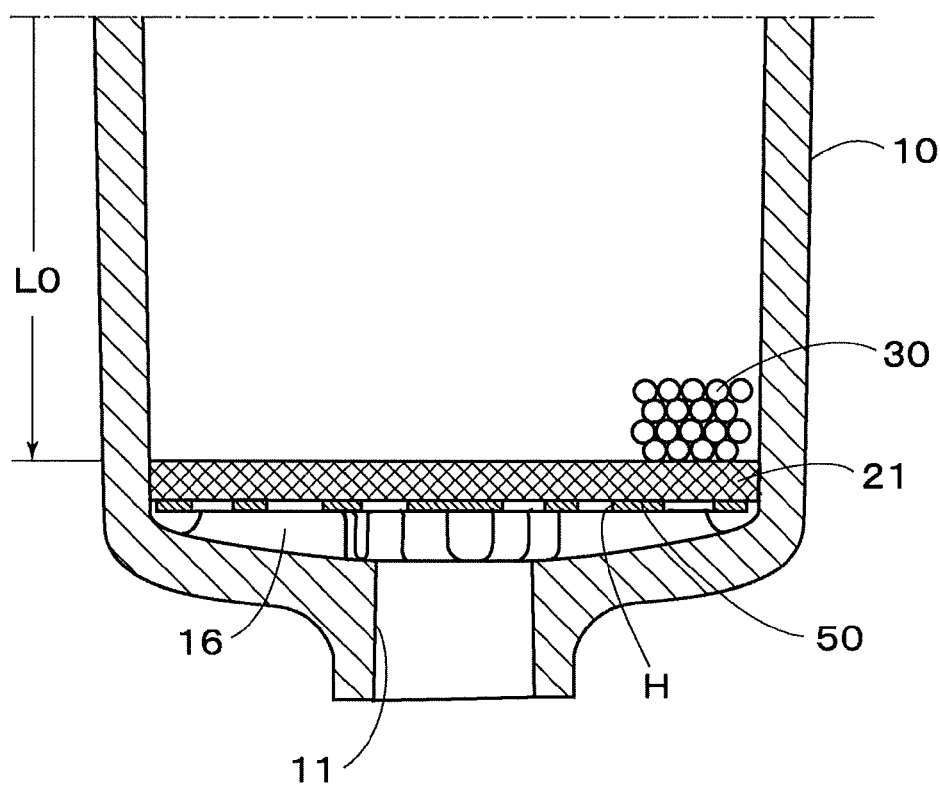
FIG. 10 is a cross sectional view illustrating an inside bottom portion of a housing of the known air drier for the air suspension.

The housing 10 having the tubular shape includes a bottom portion. A cover portion 13 is attached to an opening of the housing 10 by an annular seal S. The outflow port 12 is formed in the cover portion 13. A support plate 14 in which a plurality of connecting through-holes H is formed is firmly attached to the second filter 22. A compression spring 15 is arranged between the cover portion 13 and the support plate 14. The desiccant agents 30 are pressed in a downward direction seen in FIG. 1 by the compression spring 15 via the support plate 14 and the second filter 22. In particular, the desiccant agents 30 are supported by a biasing force of the compression spring 15 between the first filter 21 and the second filter 22 while obtaining flow paths between the particles. As illustrated in FIG. 10, a lower portion of the housing 10 of a known air drier is configured as illustrated in a cross sectional view of FIG. 10. Meanwhile, the housing 10 of the air drier D according to the first embodiment will be configured as described as follows. In addition, a support plate 50 of the housing 10 shown in FIG. 10 is formed in an annular plate in which the plurality of connecting through-holes H are formed in the same way as in the support plate 14.

Figure 2:
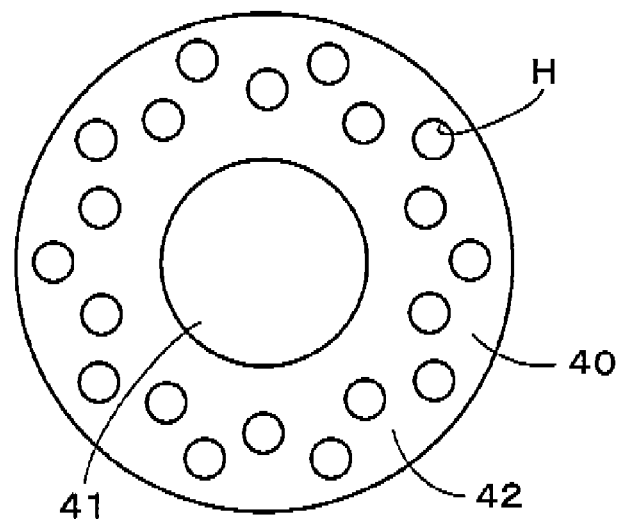
FIG. 2 is a plan view of an air guide member included in the air drier according to the first embodiment of the disclosure.

As illustrated in FIG. 1, the air guide member 40 is arranged between the inflow port 11 and the first filter 21 that is located adjacent to the inflow port 11 (at a lower side as seen in FIG. 1). The first filter 21 and one of the desiccant agents 30, which is positioned at the first filter 21 are supported by the air guide member 40. In addition, the fluid Aw is guided through the first filter 21 into the desiccant agents 30. As shown in FIGS. 1 and 2, the air guide member 40 includes a tubular shielding portion 41 (tubular portion) and an annular plate portion 42 (annular plate) extending radially outward from an opening 41a of the tubular shielding portion 41, thereby being formed to have a hat-shaped cross section. A plurality of connecting through-holes H serving as holes is formed in the annular plate portion 42. The tubular shielding portion 41 having a tubular shape includes the opening 41a, a pair of wall portions 41b, and a bottom portion 41c connecting the wall portions 41b to each other, and an inner surface 41d serving as a shielding surface. An area of the opening 41a is equal to or larger than an area of an opening of the inflow port 11. Each of the wall portions 41b extends in an axial direction of the housing 10. In particular, an inner diameter Da of the tubular shielding portion 41 is set to be twice as large as or more than twice as large as an inner diameter Db of the inflow port 11. Further, the inner diameter Da is set to be one-half of or smaller than one-half of an inner diameter Dc of the housing 10. The tubular shielding portion 41 is arranged as to cover the inflow port 11 in the axial direction, thereby forming a flow passage P guiding the fluid Aw from the inflow port 11 to the first filter 21.

Figure 3:
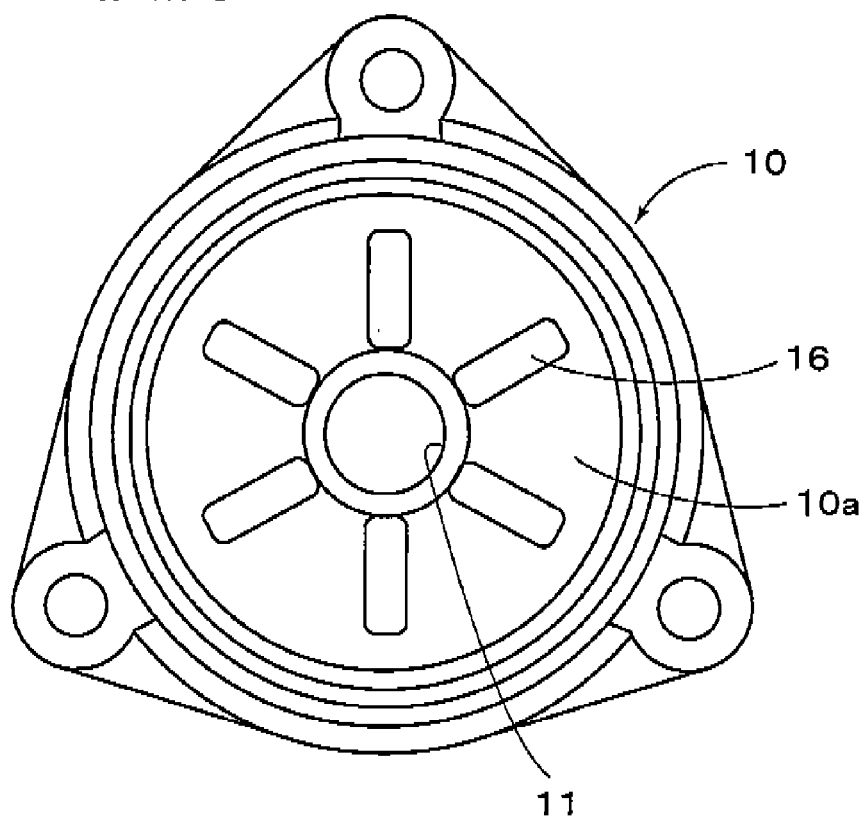
FIG. 3 is a plan view illustrating an inside bottom portion of a housing included in the air drier according to the first embodiment of the disclosure.

In particular, as illustrated in FIGS. 1 and 3, an inclined surface 10a is formed at a bottom surface of the housing 10 (at the lower side in FIG. 1), which is located at the first end of the housing 10 and adjacent to the inflow port 11 in the axial direction. The first end of the housing 10 has a shape tapered toward the inflow port 11. A plurality of ribs 16 is formed at the inclined surface 10a so as to extend upward therefrom. As illustrated in FIG. 1, the air guide member 40 is arranged so that a lower end surface of the annular plate portion 42 is in contact with upper end surfaces of the plurality of ribs 16. Thus, the flow passage P is defined by the lower end surface of the annular plate portion 42 and each clearance between the ribs 16 and is formed at an inner side of the tubular shielding portion 41.

The air guide member 40 according to the first embodiment is formed by the tubular shielding portion 41 and the annular plate portion 42 that are both made of resin so as to be integrated with each other. Alternatively, the tubular shielding portion 41 and the annular plate portion 42 that are separated from each other may be formed integrally with each other, thereby configuring the air guide member 40. In such case, the tubular shielding portion 41 and the annular plate portion 42 may be made of resin and metal, respectively.

As described above, the fluid Aw is guided from the inflow port 11 into the tubular shielding portion 41 of the air guide member 40 as shown in filled arrows in FIG. 1. Then, the fluid Aw makes contact with the shielding surface (inner surface 41d) of the tubular shielding portion 41 due to inertia; thereafter, moisture included in the fluid Aw disperses. The dispersed moisture is collected at the bottom portion of the housing 10 and appropriately discharged therefrom. Further, the fluid Aw is guided through the flow passage P to the connecting through-holes H of the annular plate portion 42 and is thereafter effectively dried by the desiccant agents 30; therefore, the dry air Ad indicated by blanked arrows is discharged through the outflow port 12 from the housing 10 and is thereafter supplied to the air spring AS.

As described above, for example, even when the volume of the desiccant agent 30 is further reduced compared to the volume of a desiccant agent utilized in the known air drier for the air suspension, the air drier D according to the first embodiment may perform a desired air-drying function. As a result, an axial length (indicated by L1 in FIG. 1) of a desiccant accommodating portion of the housing 10 between the first filter 21 and the second filter 22 may be reduced approximately to half of an axial length (indicated by L0 in FIG. 10) of a desiccant accommodating portion of the housing 10 of the known air drier; therefore, the air drier D may be formed to have a compact size compared to the known air drier. In addition, as described above, in a case where the discharge valve VE formed by the electromagnetic opening/closing valve that is consistently closed is opened when the compressor C is not in operation, the fluid Aw is discharged from the discharge valve VE via the orifice O and the air drier D; therefore, the desiccant agents 30 in a moist state turn to a dried state, that is, the moist desiccant agents 30 are dried. As a result, the desiccant agents 30 may be continuously used without replacement.

Figure 4:
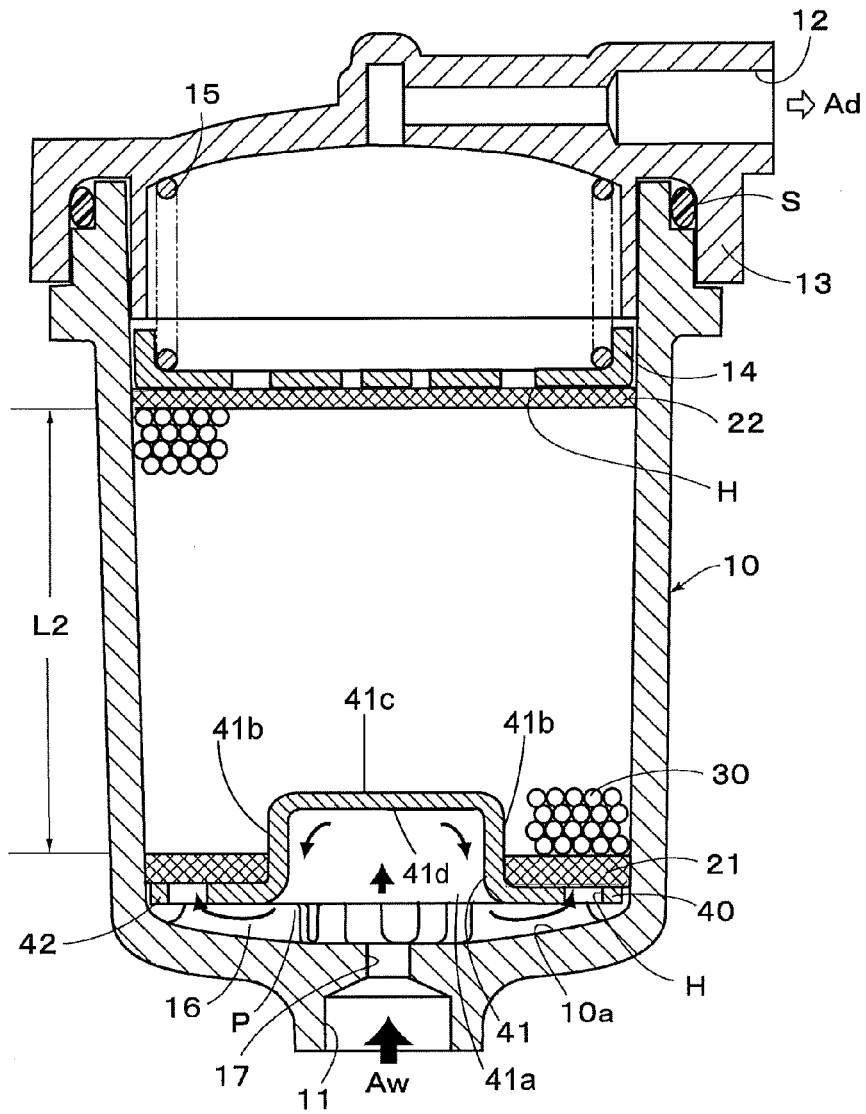
FIG. 4 is a cross sectional view of the air drier according to a second embodiment of the disclosure.

A second embodiment of the air drier D will be explained as follows with reference to FIG. 4. As illustrated in FIG. 4, an orifice 17 is formed in the housing 10. A flow rate of the fluid Aw guided from the inflow port 11 increases in the orifice 17 and the fluid Aw flows into the tubular shielding portion 41. Other configurations of the air drier D according to the second embodiment are substantially the same as those of the air drier D according to the first embodiment; therefore, the same numbers are applied to the same components and explanations of the same components will be omitted. In the second embodiment, the fluid Aw is guided from the inflow port 11 as shown by filled arrows in FIG. 4 and the flow rate of the fluid Aw increases in the orifice 17. Then, the fluid Aw flows into the tubular shielding portion 41 of the air guide member 40 and the moisture within the fluid Aw is effectively dispersed; therefore, the fluid Aw is further effectively dried.

As described above, according to the second embodiment, an axial length of the desiccant accommodating portion of the housing 10 between the first filter 21 and the second filter 22 is defined as an axial length L2 as illustrated in FIG. 4. The axial length L2 of the desiccant accommodating portion of the housing 10 may be shorter than the axial length L1 of the desiccant accommodating portion of the housing 10 according to the first embodiment, thereby further increasing installability of the air drier D relative to the vehicle.

Figure 5:
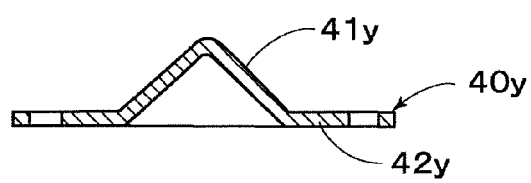
FIG. 5 is a cross sectional view of the air guide member of a first modified example of the first or second embodiment according to the disclosure.
Figure 6:
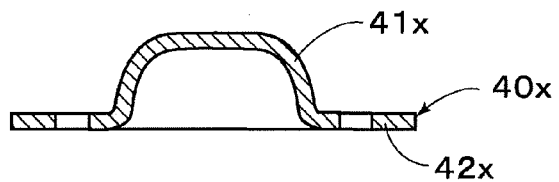
FIG. 6 is a cross sectional view of the air guide member of a second modified example of the first or second embodiment according to the disclosure.
Figure 7:
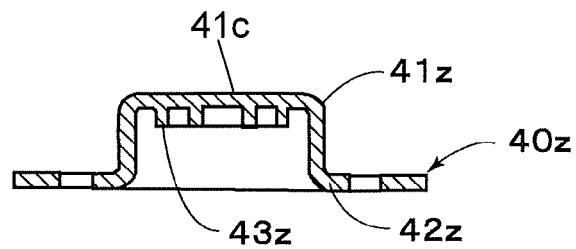
FIG. 7 is a cross sectional view of the air guide member of a third modified example of the first or second embodiment according to the disclosure.
Figure 8:
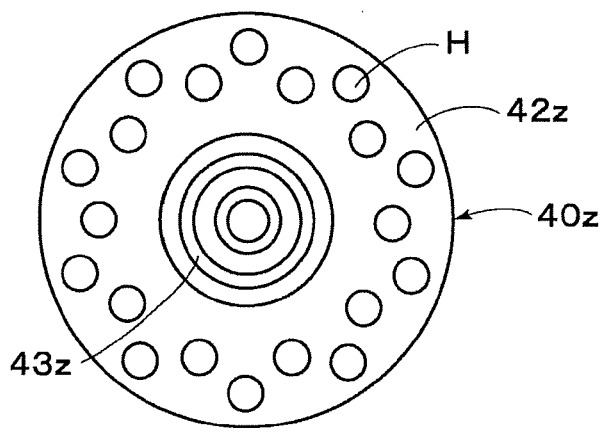
FIG. 8 is a plan view of the air guide member of the third modified example of the first or second embodiment according to the disclosure.

The air guide member 40 of the air drier D according to each of the first and second embodiments may be modified into various shapes as follows. FIGS. 5 to 7 illustrate first, second, and third modified examples of the air guide member 40 of each of the first and second embodiments and FIG. 8 illustrates the third modified example of the air guide member 40 of each of the first and second embodiments. An air guide member 40x of the first modified example illustrated in FIG. 5 is configured so that a tubular shielding portion 41x serving as the tubular portion has a conical-shaped (substantially cup-shaped) cross section. An air guide member 40y of the second modified example illustrated in FIG. 6 is configured so that a tubular shielding portion 41y serving as the tubular portion has a substantially triangular cross section. An air guide member 40z of the third embodiment illustrated in FIGS. 7 and 8 includes a tubular shielding portion 41z serving as the tubular portion and having the same outer shape as that of the tubular shielding shape 41 illustrated in FIG. 1. The air guide member 40z further includes a plurality of annular convex portions 43z (protruding portions) formed at the bottom portion 41c so as to protrude therefrom. In addition, each of annular plate portions 42x, 42y, and 42z of the air guide members 40x, 40y, and 40z, respectively has substantially the same shape as that of the annular plate portion 42 illustrated in FIG. 1 and the plurality of connecting through-holes H (holes) is formed in each of the annular plate portions 42x, 42y, and 42z.

As described above, the air drier D for the air suspension of the vehicle for supplying dry air Ad to the air suspension, includes the housing 10 having the tubular shape and including the inflow and outflow ports 11 and 12 formed at the first and second ends, respectively, in the axial direction, the first and second filters 21 and 22 accommodated in the housing 10, the desiccant agents 30 supported between the first and second filters 21 and 22, and the air guide member 40 arranged between the first filter 21 and the first end of the housing 10 where the inflow port 11 is formed, the air guide member 40 supporting the first filter 21 and one of the desiccant agents 30, the air guide member 40 including the tubular shielding portion 41 having the opening 41a that has the area larger than the area of the opening of the inflow port 11, the wall portions 41b that extend in the axial direction of the housing 10, the bottom portion 41c, and the inner surface 41d, the tubular shielding portion 41 covering the inflow port 11 in the axial direction to form the flow passage P guiding the fluid Aw from the inflow port 11 to the first filter 21, and the annular plate portion 42 extending radially outward from the opening 41a of the tubular shielding portion 41 and including the plurality of connecting through-holes H. The fluid Aw guided from the inflow port 11 into the tubular shielding portion 41 passes through the flow passage P to the connecting through-holes H of the annular plate portion 42 to flow through the first filter 21 into the desiccant agents 30 and is dried by the desiccant agents 30, and the dry air Ad is discharged from the outflow port 12 to the air suspension.

Thus, the air drier D includes the air guide member 40 configured as described above; therefore, the fluid Aw is guided from the inflow port 11 to the tubular shielding portion 41 and thereafter makes contact with the shielding surface due to inertia. Then, the moisture within the fluid Aw disperses and the fluid Aw from which the moisture is removed is appropriately guided through the flow passage P to the connecting through-holes H of the annular plate portion 42. As a result, the fluid Aw is effectively dried by the desiccant agents 30 and therefore turns to the dry air Ad. Consequently, the dry air Ad is discharged from the outflow port 12. In other words, for example, even in a case where the volume of the desiccant agent 30 is further reduced compared to the desiccant agent utilized in the known air drier, the air drier D according to the aforementioned first and second embodiments may perform the desired air-drying function; therefore, the axial length L1 of the desiccant accommodating portion of the housing 10 may be shorter than the axial length L0 of the desiccant accommodating portion of the housing 10 of the know air drier.

According to the second embodiment, the housing 10 includes the orifice 17 for increasing the flow rate of the fluid Aw guided from the inflow port 11 to the tubular shielding portion 41 of the air guide member 40.

Since the air drier D according to the second embodiment includes the orifice 17, the flow rate of the fluid Aw guided from the inflow port 11 increases in the orifice 17 and the fluid Aw flows into the tubular shielding portion 41. Accordingly, the moisture within the fluid AW further effectively disperses; therefore, the fluid Aw is further effectively dried. As a result, the axial length L2 of the desiccant accommodating portion of the housing 10 may be further reduced, thereby further increasing the installability of the air drier D relative to the vehicle.

According to the aforementioned first and second embodiments, the tubular shielding portion 41 is attached to the annular plate portion 42 so as to be integrated therewith.

According to the aforementioned first and second embodiments, the inclined surface 10a is formed at the first end of the housing 10, the first end of the housing 10 being adjacent to the inflow port 11 and having the shape tapered toward the inflow port 11, and the plurality of ribs 16 is formed at the inclined surface 10a so as to extend upward therefrom. The flow passage P is defined by the lower end surface of the annular plate portion 42 and each clearance between the ribs 16 and is formed at the inner side of the tubular shielding portion 41.

Thus, the air drier D includes the housing 10 having the plurality of ribs 16 formed at the inclined surface 10a so as to extend upward therefrom; thereby, the flow passage P is defined by the upper end surface of the annular plate portion 42 and each clearance between the ribs 16 and is formed at the inner side of the tubular shielding portion 41. Thus, an additional flow passage does not need to be formed in the housing 10; therefore, the housing 10 may be simply configured so that the fluid Aw is guided from the inflow port 11 to the tubular shielding portion 41.

According to the aforementioned the first modified example of each of the first and second embodiments, the tubular shielding portion 41x of the air guide member 40x has the cup-shaped cross section in the axial direction of the housing 10.

According to the aforementioned the second modified example of each of the first and second embodiments, the tubular shielding portion 41y of the air guide member 40y has the triangular cross section in the axial direction of the housing 10.

According to the aforementioned the first and second embodiments, the wall portion 41b of the tubular shielding portion 41 includes the plurality of wall portions 41b and the bottom portion 41c of the tubular shielding portion 41 connecting the plurality of wall portions 41b to each other. Further, according to the third modified example of each of the first and second embodiments, the bottom portion 41c of the tubular shielding portion 40z has the annular convex portions 43z.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An air drier for an air suspension of a vehicle for supplying dry air to the air suspension, comprising:
a housing having a tubular shape and including inflow and outflow ports formed at first and second ends, respectively, in an axial direction;
first and second filters accommodated in the housing;
a desiccant agent supported between the first and second filters; and
an air guide member arranged between the first filter and the first end of the housing where the inflow port is formed, the air guide member supporting the first filter and the desiccant agent,
the air guide member comprising:
a tubular portion including an opening that has an area larger than an area of an opening of the inflow port, a wall portion that extends in the axial direction of the housing, a bottom portion connected to the wall portion, and an inner surface, the tubular portion covering the inflow port in the axial direction to form a flow passage guiding fluid from the inflow port to the first filter; and
an annular plate extending radially outward from the opening of the tubular portion and including a plurality of holes,
wherein the fluid guided from the inflow port into the tubular portion passes through the flow passage to the holes of the annular plate to flow through the first filter into the desiccant agent and is dried by the desiccant agent, and the dry air is discharged from the outflow port to the air suspension, and wherein the first filter is located on a part of the annular plate except for the bottom portion of the tubular portion.

2. The air drier according to claim 1, wherein the housing includes an orifice for increasing a flow rate of the fluid guided from the inflow port to the tubular portion of the air guide member.

3. The air drier according to claim 1, wherein the tubular portion is attached to the annular plate so as to be integrated therewith.

4. The air drier according to claim 2, wherein the tubular portion is attached to the annular plate so as to be integrated therewith.

5. The air drier according to claim 1, wherein an inclined surface is formed at the first end of the housing, the first end of the housing being adjacent to the inflow port and having a shape tapered toward the inflow port, and a plurality of ribs is formed at the inclined surface so as to extend upward therefrom, and wherein the flow passage is defined by a lower end surface of the annular plate and each clearance between the ribs and is formed at an inner side of the tubular portion.

6. The air drier according to claim 2, wherein an inclined surface is formed at the first end of the housing, the first end of the housing being adjacent to the inflow port and having a shape tapered toward the inflow port, and a plurality of ribs is formed at the inclined surface so as to extend upward therefrom, and wherein the flow passage is defined by a lower end surface of the annular plate and each clearance between the ribs and is formed at an inner side of the tubular portion.

7. The air drier according to claim 3, wherein an inclined surface is formed at the first end of the housing, the first end of the housing being adjacent to the inflow port and having a shape tapered toward the inflow port, and a plurality of ribs is formed at the inclined surface so as to extend upward therefrom, and wherein the flow passage is defined by a lower end surface of the annular plate and each clearance between the ribs and is formed at an inner side of the tubular portion.

8. The air drier according to claim 1, wherein the tubular portion of the air guide member has a cup-shaped cross section in the axial direction of the housing.

9. The air drier according to claim 1, wherein the tubular portion of the air guide member has a triangular cross section in the axial direction of the housing.

10. The air drier according to claim 1, wherein the wall portion of the tubular portion includes a plurality of wall portions and the bottom portion of the tubular portion connecting the plurality of wall portions to each other has a protruding portion.

11. An air drier for an air suspension of a vehicle for supplying dry air to the air suspension, comprising:
   a housing having a tubular shape and including inflow and outflow ports formed at first and second ends, respectively, in an axial direction;
   first and second filters accommodated in the housing;
   a desiccant agent supported between the first and second filters; and
   an air guide member arranged between the first filter and the first end of the housing where the inflow port is formed, the air guide member supporting the first filter and the desiccant agent,
   the air guide member comprising:
      a tubular portion including an opening that has an area larger than an area of an opening of the inflow port, a wall portion that extends in the axial direction of the housing, a bottom portion connected to the wall portion, and an inner surface, the tubular portion covering the inflow port in the axial direction; and
      an annular plate extending radially outward from the opening of the tubular portion and including a plurality of holes,
   wherein the first filter is located on a part of the annular plate except for the bottom portion of the tubular portion.

12. The air drier according to claim 11, wherein a flow passage guiding fluid from the inflow port to the first filter is defined by the air guide member and the first end of the housing where the inflow port is formed, and wherein the fluid guided to the tubular portion of the air guide member passes through the flow passage to the holes of the annular plate to flow through the first filter into the desiccant agent and is dried by the desiccant agent, and the dry air is discharged through the outflow port from the housing to the air suspension.

* * * * *